J. T. HAWKER.
CULTIVATOR.
APPLICATION FILED FEB. 18, 1911.
1,010,362.
Patented Nov. 28, 1911.
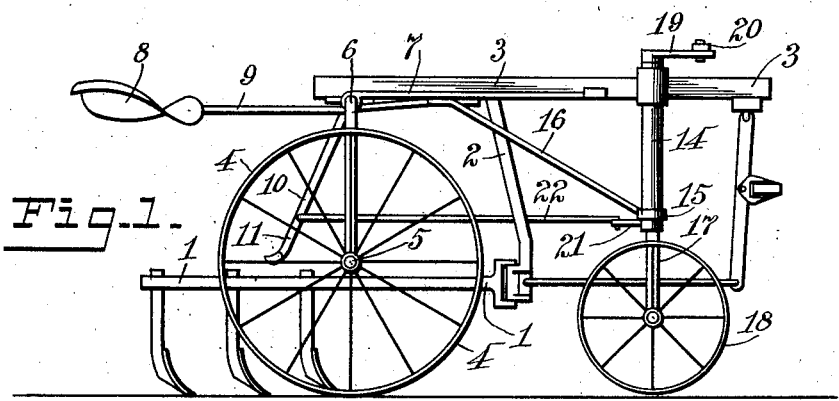
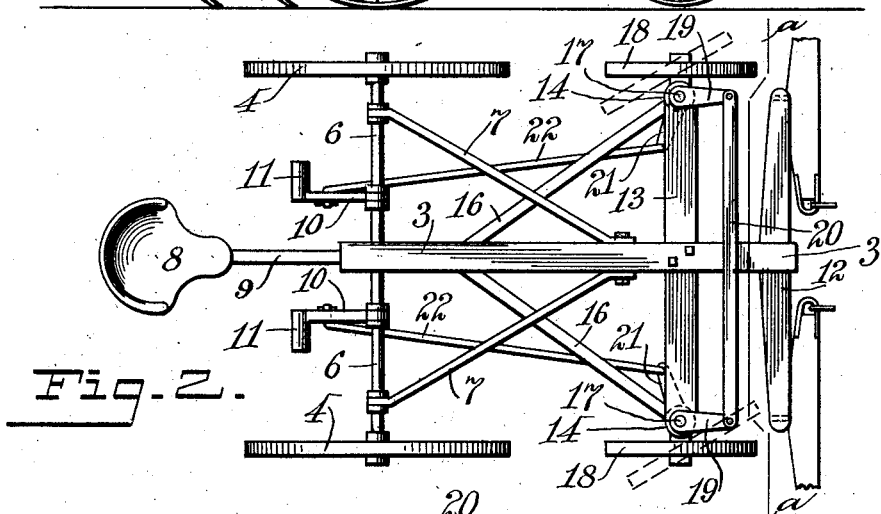
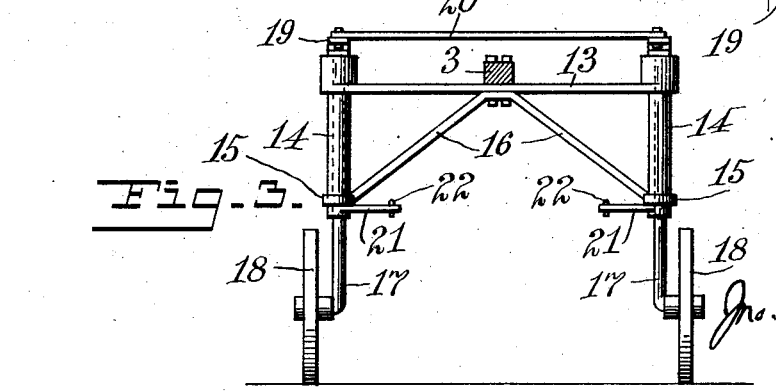

UNITED STATES PATENT OFFICE.

JOHN T. HAWKER, OF NEAR XENIA, OHIO.

CULTIVATOR.

1,010,362.

Specification of Letters Patent.

Patented Nov. 28, 1911.

Application filed February 18, 1911. Serial No. 609,362.

*To all whom it may concern:*

Be it known that I, JOHN T. HAWKER, a citizen of the United States, residing near Xenia, in the county of Greene and State of Ohio, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cultivators, for example, corn plows.

More definitely speaking, the improvements relate to a forward steering mechanism consisting of a truck frame, steering wheels, etc., so connected with the cultivator frame proper that said mechanism may be manipulated by the rider of the cultivator.

The object of the invention is to provide means for making a short turn of the cultivator in the field, thereby avoiding the tramping down of the standing plants, for example, corn, while driving the cultivator back at the end of each row.

Before describing the invention at length, the accompanying drawings are referred to as follows.

Figure 1 is a side elevation of a corn plow having my turning mechanism attached. Fig. 2 is a top plan view. Fig. 3 is a sectional elevation on the line *a—a* of Fig. 2, looking rearward.

In a particular description of the invention, similar reference characters indicate corresponding parts in the drawings, and description.

The parts of the cultivator proper consist of the usual triangular gang frame 1, which is pivoted at its forward end to a hanger 2 suitably connected to the upper longitudinal draft bar 3. The cultivator wheels 4 are supported upon axles 5 extending down from a cross shaft 6, supported in a well known manner by brace bars 7 extending rearwardly from the draft bar 3. The driver's seat 8 is supported in a common manner upon the rear end of bar 9, which is rigidly secured to the draft bar. Treadle bars 10 extend down in proximity to the feet of the driver and support feet rests or stirrups 11. The cross beam 12 attached to the front end of the draft beam 3 supports the usual swingletree attachments. This is about all that it is necessary to specify regarding the old and well known parts of the cultivator running gear proper.

Referring now to the features embraced within the scope of my invention, 13 is a cross beam secured rigidly to the draft beam 3. The ends of said cross beam receive upright tubular members 14, the lower ends of which are inclosed by collars 15 from which extend braces 16 united to said cross beam 13. Projected through the tubular member 14 are upright rods 17, the lower ends of which support two small front steering wheels 18. The ends of the uprights 17 extending above the upper ends of the tubular members 14, have attached to them crank arms 19 the outer ends of which are connected by a pivotal transverse connecting rod 20. The said uprights 17 also have another set of cranks 21 connected to them below the said tubular members. The upper set of cranks compel the axle rods 17 and the steering wheels to move in unison. The lower set of cranks have connecting rods 22 extending rearwardly therefrom, and these connecting rods are coupled with the treadle bars 10. In guiding the steering wheels only one treadle is actuated at a time. For example, the left treadle is instrumental in turning said wheels to the left, and the right treadle to the right. The facility for operating the said steering wheels from one or the other treadle is due to the upper set of cranks and connecting rod.

Having described my invention, I claim:

In a cultivator, the combination with a frame, front and rear axles, the front axles being extended upwardly and swiveled to said frame, and wheels mounted on said front and rear axles, of cranks at the upper ends of said front axle extensions, a single connecting link between said cranks, cranks at the lower portions of said front axle extensions, foot pedals pivoted to the rear axle, and links connecting said foot pedals with the last mentioned cranks, substantially as specified.

In testimony whereof I affix my signature, in presence of two witnesses.

JOHN T. HAWKER.

Witnesses:
R. J. McCARTY,
HOWARD S. SMITH.

Copies of this patent may be obtained for five cents each, by addressing the "Commissioner of Patents, Washington, D. C."